Dec. 1, 1942.   R. J. NEWTON   2,303,755
PINEAPPLE HANDLING APPARATUS
Filed May 20, 1940

Inventor
Robert J. Newton
By Lyon & Lyon
Attorneys

Patented Dec. 1, 1942

2,303,755

UNITED STATES PATENT OFFICE 2,303,755

PINEAPPLE HANDLING APPARATUS

Robert J. Newton, Honolulu, Territory of Hawaii, assignor to California Packing Corporation, San Francisco, Calif., a corporation of New York Application May 20, 1940, Serial No. 336,185

7 Claims. (Cl. 198—85)

This invention relates to pineapple handling apparatus and more particularly to an apparatus for handling pineapples and delivering the same to peeling machines or "ginacas."

In the handling of pineapples, it has heretofore been common practice to deliver the pineapples to the peeling machines or ginacas by hand. It has been suggested that means should be utilized for grading the pineapples so as to deliver to the ginacas graded pineapples over a conveyer belt. Such sytems all depend upon a constancy of supply and grading to insure a uniform supply of pineapples to the ginacas or peeling machines.

It is an object of this invention to provide a means for delivering pineapples to the ginacas which insures a uniform delivery to the peeling machines of pineapples as graded, irrespective of the constancy of the grading operations.

Another object of this invention is to provide a delivery means applicable for delivering articles to a point of use and wherein there is provided an auxiliary means operable to accumulate excess articles passing over the delivery means and to return the same to the delivery means when the rate of delivery of the articles to the delivery means falls below the requirements of delivery.

Another object of this invention is to provide a conveyer delivery mechanism including a delivery conveyer and a storage and delivery conveyer and means whereby excess articles from the delivery conveyer are transferred to the storage and delivery conveyer to be returned to the delivery conveyer when a variation in rate of delivery of the articles on the delivery conveyer occurs.

Other objects and advantages of this invention it is believed will be apparent from the following detailed description of a preferred embodiment thereof as illustrated in the accompanying drawing.

Figure 1:
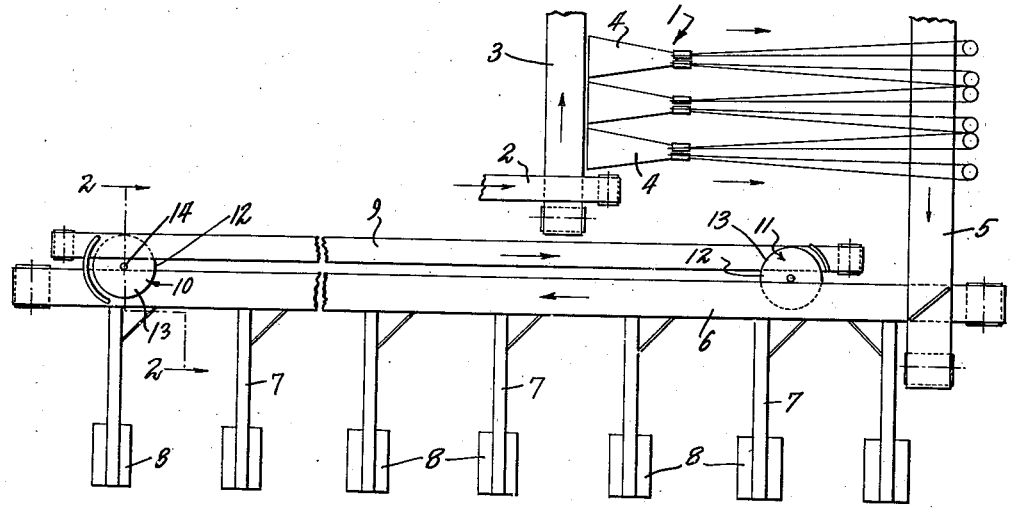
Figure 1 is a top plan view of an article handling apparatus embodying my invention.

In the preferred embodiment of my invention as illustrated in the accompanying drawing, I indicates a segregating or grading machine which may be of any suitable or desirable type and is herein illustrated as including a means whereby pineapples as delivered into a packing house upon a conveyer 2, are transferred by the transfer conveyer 3 to grading units 4 which may be of any suitable or desirable type as, for example, illustrated in my co-pending application, Serial No. 310,159, filed December 20, 1939, for Pineapple sorting apparatus.

Graded pineapples of a particular size are transferred by a transfer conveyer 5 to a delivery and feed conveyer 6 by means of which the segregated articles as, for example, the pineapples, are delivered to the respective chutes 7 for feeding into the ginacas or pineapple peeling machines as indicated diagrammatically at 8.

The efficacy of the operation of this system of course depends upon a uniform supply of articles to the operating or peeling machines 8 so that should the supply of pineapples as delivered to the packing house on the conveyer 2 or the particular size of pineapples as delivered on the conveyer belt 5 fall below the requirements of the operating machine 8, it would necessitate discontinuance of the operations of the machines 8, thereby resulting in inefficiency of operation of the entire unit. If, on the other hand, the pineapples of the particular size to be conveyed by the conveyer 6 at some period of time exceed the requirements of the machines 8, it would necessitate the shutting down of the grading apparatus 1 in order to avoid the piling up of the articles or fruit upon the conveyer 6.

In order to overcome both of these difficulties and to enable constancy of operation of the machines 8, I provide an auxiliary storage and delivery conveyer 9 which is positioned adjacent the conveyer 6 and to which fruit or articles in excess of those actually required for operation of the machines 8 at any particular time are transferred by means of a transfer means 10.

Means are provided for retransferring the articles or pineapples as transferred to the storage and delivery conveyer 9 back to the conveyer 6 at any time that the rate of delivery of pineapples to the conveyer 6 falls below the requirements of the machines 8. This transfer means is indicated at 11. The transfer means 10 and 11 as provided also operate in a manner to retard transfer of the articles or pineapples from the conveyer 6 to the conveyer 9 or from the conveyer 9 back to the conveyer 6 and in this way insure the building up of the pineapples or articles upon the conveyer 6 or for storing the pineapples or articles upon the conveyers 9 in such manner as to at all times insure adequacy of the supply of the articles for the operations of the machine 8.

Figure 2:
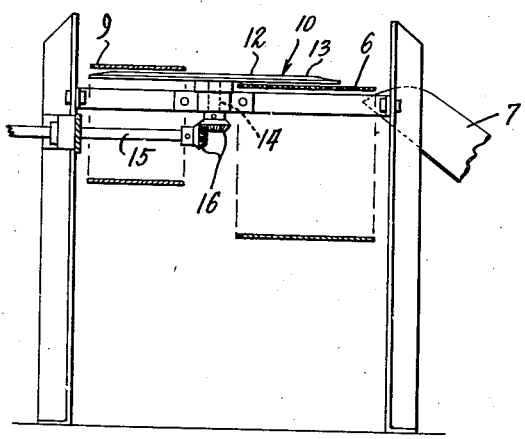
Figure 2 is a sectional view taken substantially on the line 2—2 of Figure 1.

In order to accomplish this object, the transfer means 10 and 11, both of which are similar in construction and in operation, include transfer discs 12, the receiving portions 13 of which overlie the conveyer from which they are taking the articles and extend under the conveyer to which they are transferring the articles. Thus as indicated in Figure 2, in connection with the transfer mechanism 10, the disc 12 overlies the conveyer 6 and extends under the conveyer 9.

In the case of the transfer mechanism 11, the transfer disc 12 overlies the storage and delivery conveyer 9 and extends under the conveyer 6. Each of the conveyers 6 and 9 as illustrated, are of the continuous belt type trained over end pulleys one of which at least is driven. The transfer discs are mounted upon vertical shafts 14 and are driven from any suitable source of power delivered through a power shaft 15 and through meshing gears 16. The rate of drive of the transfer discs is substantially the same as the rate of drive of the conveyers 6 and 9. It is, however, possible, depending upon the conditions of operation, to vary the rate of drive of the transfer discs in order to speed up the rate of transfer or to slow down the rate of transfer. Thus where it is desired to build up a greater supply of pineapples upon the storage and delivery belt 9 to retard the rate of transfer from the conveyer 6 to the conveyer 9, the rate of drive of the discs 10 is slowed down to materially retard the rate of transfer.

The operation of the handling apparatus embodying my invention is:

The articles conveyed on the conveyer 6 are delivered through the chutes 7 to the machines 8 at such rate as the machines 8 are operating if, of course, the supply of articles onto the conveyer 6 is sufficient to meet the rate of operation of the multiple machines 8.

When the rate of delivery of the articles or pineapples onto the conveyer 6 exceeds the requirements of the machines 8, the said articles of course proceed along the conveyer 6 to the point of the transfer mechanism 10. As the transfer mechanism 10 at this point overlies the conveyer 6, a resistance is built up to the articles raised onto the transfer disc 12 so that the articles tend to build up from this point back along the conveyer 6 until a point is reached where the urge of the oncoming fruit or articles is sufficient to cause the articles to ride onto the transfer disc 12 and hence be transferred onto the conveyer 9.

A further resistance to the free transfer is of course provided by the fact that the conveyer 9 also overlies the disc 12 of the transfer mechanism 10. Thus a point is reached, depending upon the conditions of operation at which each additional article in advance of those actually required by the machines 8 causes a corresponding article or number of articles to be transferred to the storage and transfer conveyer 9. The same condition of operation occurs upon the storage and transfer conveyer 9, that is, the fruit builds up upon this conveyer to the point of desired storage, depending upon the conditions of operation of the respective conveyers and transfer mechanisms.

When a fruit or article is attempted to be delivered from the conveyer 9 back to the conveyer 6 under the urge of the conveyer 9 and the urge of the oncoming fruit or articles, such delivery will take place when the article is transferred to the disc 12 of the transfer mechanism 11, assuming of course that there is no article on the conveyer 6 at the point of delivery, under which condition the two articles which interfere, again retarding delivery back to the conveyer 6. If the conveyer 6 is free, however, there will be a continuous feed by the transfer mechanism 11 back to the conveyer 6 because the starting of the movement of the articles along the conveyer 9 will continue the articles being transferred until such time as interference again results, at which time an article will remain on the conveyer 9 at the point of the transfer disc 11 until another article comes along to again disturb the condition of equilibrium. Thus if no articles are delivered for a period of time from the grading mechanism onto the conveyer 6, the storage articles on the conveyer 9 will take up this slack and continue to feed the articles or pineapples to the conveyer 6 at such rate as will accommodate the operation of all of the machines 8. In this manner I am able to automatically and at all times within the limits of the capacity of the storage conveyer 9 maintain a uniform supply of articles to the operating machines 8.

Having fully described my invention, it is to be understood that I do not wish to be limited to the details herein set forth, but my invention is of the full scope of the appended claims.

I claim:

1. In an article handling apparatus, the combination of a driven delivery conveyer adapted to receive articles, a driven storage conveyer mounted adjacent said delivery conveyer, a driven transfer means positioned adjacent one end of said delivery conveyer operative to transfer articles from said delivery conveyer to said storage conveyer, said transfer means traveling slower than said delivery conveyer to retard delivery of articles from said delivery conveyer to said storage conveyer, and means positioned adjacent the opposite end of said storage conveyer operative to effect the transfer of articles from said storage conveyer back to said delivery conveyer.

2. In an article handling apparatus, the combination of a driven delivery conveyer adapted to receive articles, a driven storage conveyer mounted adjacent the delivery conveyer, a driven transfer means positioned adjacent one end of said delivery conveyer operative to transfer articles from said storage conveyer to said delivery conveyer, said transfer means traveling slower than said storage conveyer to retard delivery of articles from said storage conveyer to said delivery conveyer, and means positioned adjacent the opposite end of said delivery conveyer and operative to effect the transfer of articles from said delivery conveyer to said storage conveyer.

3. In an article handling apparatus, the combination of a driven delivery conveyer adapted to receive articles, a driven storage conveyer mounted adjacent said delivery conveyer, said conveyers being of approximately equal length, a driven, variable speed transfer means positioned adjacent one end of said conveyers operative to transfer articles from one of said conveyers to the other, said variable speed transfer means being adjustable to travel slower than the conveyer from which it receives articles to retard delivery of articles to the other of said conveyers at a desired retarding rate, and means positioned adjacent the opposite end of said conveyers operative to effect the transfer of articles from one conveyer to the other.

4. In a pineapple handling apparatus, the combination of a driven, endless, article delivery conveyer mounted in substantially horizontal position and adapted to convey articles to a plurality of operating machines, a storage conveyer positioned adjacent and parallel to the delivery conveyer, a driven transfer disc positioned adjacent one end of said delivery conveyer and mounted so that its periphery extends substantially over the conveyer and a portion of its periphery extends substantially under the storage conveyer, said transfer disc traveling slower than said delivery conveyer to retard delivery of articles from said delivery conveyer to said storage conveyer, and means positioned near the opposite end of said delivery conveyer and operative to effect the transfer of articles from the storage conveyer back to the delivery conveyer, whereby the said conveyers, transfer disc and said last-mentioned means provide a continuous pineapple circuit and wherein the portion of the transfer disc extending above said delivery conveyer acts to retard the progress of the pineapples along said delivery conveyer so that the transfer of pineapples from said delivery conveyer to said storage conveyer is effected through the urge of the pineapples upon said delivery conveyer.

5. In an article handling apparatus, the combination of a driven endless article delivery conveyer mounted in substantially horizontal position and adapted to convey articles to a plurality of operating machines, a storage conveyer positioned adjacent the delivery conveyer, said storage conveyer being of the driven endless belt type, a transfer disc mounted near the end of the delivery conveyer in position so that a portion thereof extends over the surface of the delivery conveyer, and a portion thereof extends below the surface of the storage conveyer, means for driving the transfer disc, and a transfer disc positioned near the other end of the delivery conveyer, and having a portion extending over the surface of the storage conveyer, and a portion extending under the surface of the delivery conveyer, and means for driving the second said transfer disc.

6. In a pineapple handling apparatus, the combination of a driven endless article delivery conveyer mounted in substantially horizontal position and adapted to convey articles to a plurality of operating machines, a storage conveyer positioned adjacent and parallel to the delivery conveyer, a driven transfer disc mounted so that its periphery extends substantially over the delivery conveyer and a portion of its periphery extends substantially under the storage conveyer, and a second driven transfer disc spaced along the delivery conveyer from the first said driven transfer disc and the second said transfer disc having a portion of its periphery extending over the storage conveyer and a portion of its periphery extending under the delivery conveyer whereby the said conveyers and transfer discs provide a continuous pineapple circuit and wherein the portions of the transfer discs extending above the respective conveyers act to retard the progress of the pineapples along the respective conveyers so that transfer of pineapples from one conveyer to the other is effected through the urge of the pineapples upon the respective conveyers.

7. In a pineapple handling apparatus for supplying pineapples to peeling machines, feed means including a substantially horizontal driven endless delivery conveyer, a driven endless storage conveyer positioned adjacent to, parallel with, and having its conveying surface in the same plane as the delivery conveyer, and a pair of spaced transfer discs operatively positioned between the delivery and storage conveyers, the transfer disc acting to transfer pineapples from the delivery to the storage conveyer being positioned with a portion of the disc over the delivery conveyer, and a portion of the disc under the storage conveyer and the other transfer disc being positioned with a portion of the disc over the storage conveyer and a portion of the disc below the delivery conveyer whereby storage of pineapples upon the delivery and storage conveyers is had due to the retarding effect of the transfer discs operating above the said conveyers.

ROBERT J. NEWTON,